(12) United States Patent
Ranalli et al.

(10) Patent No.: US 7,010,909 B2
(45) Date of Patent: Mar. 14, 2006

(54) MOTOR VEHICLE EQUIPPED WITH A DIESEL PROPULISON ENGINE

(75) Inventors: Marco Ranalli, Augsburg (DE); Stefan Schmidt, Langweid (DE); Andreas Mayr, Waltershofen (DE); Jurgen Klement, Asbach-Baumenheim (DE)

(73) Assignee: Zeuna-Starker GmbH & Co. KG, (DE)

( * ) Notice: Subject to any disclaimer, the term of this patent is extended or adjusted under 35 U.S.C. 154(b) by 15 days.

(21) Appl. No.: 10/727,136

(22) Filed: Dec. 3, 2003

(65) Prior Publication Data
US 2005/0120708 A1  Jun. 9, 2005

(51) Int. Cl.
*F01N 3/00* (2006.01)

(52) U.S. Cl. .............................. 60/286; 60/295; 60/297; 60/303

(58) Field of Classification Search .................. 60/274, 60/285, 286, 295, 303, 297, 311; 123/1 A, 123/3, DIG. 12
See application file for complete search history.

(56) References Cited

U.S. PATENT DOCUMENTS

| | | | |
|---|---|---|---|
| 5,894,728 A * | 4/1999 | Wakamoto | 60/286 |
| 6,260,353 B1 * | 7/2001 | Takahashi | 60/286 |
| 6,314,919 B1 * | 11/2001 | Pugachev | 123/3 |
| 6,387,336 B1 * | 5/2002 | Marko et al. | 423/212 |
| 6,832,473 B1 * | 12/2004 | Kupe et al. | 60/286 |
| 6,834,498 B1 * | 12/2004 | van Nieuwstadt et al. | 60/286 |
| 6,837,041 B1 * | 1/2005 | Hernier | 60/286 |

* cited by examiner

*Primary Examiner*—Tu M. Nguyen
(74) *Attorney, Agent, or Firm*—Carlson, Gaskey & Olds

(57) ABSTRACT

A motor vehicle includes a diesel propulsion engine having an exhaust system. The exhaust system includes a discontinuously regenerating exhaust gas purification system including a catalytic converter unit for burning diesel fuel catalytically and a fuel evaporator unit connected upstream of the catalytic converter unit. The fuel evaporator unit includes an electrical heating element and is connected to the fuel tank of the vehicle by a fuel line. The fuel evaporator unit is spatial from any exhaust gas carrying components. A fuel vapor feeding channel upstream of the catalytic converter unit discharges into an exhaust gas carrying component and extends between the fuel evaporator unit and an exhaust gas carrying component.

20 Claims, 2 Drawing Sheets

MOTOR VEHICLE EQUIPPED WITH A DIESEL PROPULSION ENGINE

BACKGROUND OF THE INVENTION

This invention relates generally to a motor vehicle equipped with a diesel propulsion engine including an exhaust system having a discontinuously regenerating exhaust gas purification system with a catalytic converter unit that burns diesel fuel catalytically. The continuously regenerating exhaust gas purification system may include diesel particulate filters and $NO_x$ accumulating catalytic converters.

To comply with environmental specifications, the exhaust gases of motor vehicles propelled by combustion engines are purified. Specifically, appropriate particulate filters are utilized to reduce the particulate emission of the exhaust gases of motor vehicles propelled by diesel engines. The particulate filters need to be periodically regenerated by burning off the particles accumulated on the filter surface. Due to the relatively low exhaust gas temperatures of modem diesel engines, to initiate regeneration, the exhaust gas temperature must be raised using appropriate measures or devices if filter regeneration is to be feasible in conditions other than full load operation, even when using fuel additives capable of lowering the particulate ignition temperature. Without the additive's, and depending on the soot composition, the particulate ignition temperature ranges between 470° C. and 600° C., by approximately 100° C., but in the long run cause the particulate filter to clog, necessitating cleaning.

For this purposel various burners (refer to DE 19504183 A1 and DE 19717544 A1) have been installed upstream of the particulate filter. However, there are several drawbacks to employing burners. For one, they are expensive. Additionally, an increased amount space is required for installation due to the integration of the comparatively large burner into the exhaust system. Finally, the burner has a detrimental effect on the flow conditions within the exhaust pipe.

One solution proposed in EP 132166 A1 is using a low-boiling, organic fluid that evaporates on a glow plug that extends into the exhaust gas carrying component connected upstream of the particulate filter where the vapors ignite either after mixing with the oxidic exhaust gas at the tip of the glow plug or, without ignition, are mixed with the stream of exhaust gases. In the latter case, catalytic oxidation of the vapors of the low boiling organic fluid in a catalytically coated area of the particulate filter causes a temperature increase of the exhaust gases ducted to the particulate filter. A particular disadvantage of this is the engineering and logistic effort concerning the storage of the low boiling organic fluid. Furthermore, the regeneration of the diesel particulate filter utilizing this heating device requires exhaust gas temperatures above 450° C., which in modern diesel engines can only be attained under full load.

DE 3139565 A1, from which a general motor vehicle may be derived, describes the injection of diesel fuel using atomizer nozzles in, or immediately ahead of, a catalytically coated area of a particulate filter to increase the exhaust gas temperature by catalytic oxidation of the fuel. An electrical heating element imbedded in the catalytically coated area of the particulate filter initiates catalytic oxidation. There are several disadvantages of this system. For one, there is considerable non-homogeneity of the temperature distribution. Additionally, the atomized fuel absorbs heat from the exhaust gas stream through partial evaporation. Additionally, given the conditions prevailing in non-purified exhaust gases the atomizer nozzles tend to clog, rendering the affected heating device non-functional within a short period of time and explaining why these systems never went into production.

Finally, attempts have been made to increase the exhaust gas temperature to the ignition temperature of the soot collected on the particulate filter by using electrical heating elements. These attempts were quickly aborted because the required electrical power was not able to be provided in conventional motor vehicles.

$NO_x$ accumulating catalytic converters are increasingly used to reduce the emission of nitrogen oxides. Regeneration of the former requires an enrichment of the exhaust gases. While this is not a problem with gasoline engines, diesel engines operating with excess air and whose exhaust gases also contain excess air require special measures to be taken.

SUMMARY OF THE INVENTION

The object of the present invention is to create a motor vehicle of the above-described type equipped with an exhaust system including a discontinuously regenerating exhaust gas purification system. The regenerating exhaust gas purification system is low in cost and has technically simple subassemblies for the regenerating mode of the exhaust gas purification system, that require only a small amount of additional installation space, are low-maintenance, and highly reliable.

An upstream fuel evaporator unit is connected to a catalytic converter unit. The fuel evaporator unit includes an electrical heating element and is connected to a vehicle fuel tank by a fuel line. The fuel evaporator unit is installed with spatial separation from exhaust gas carrying components. A fuel vapor feeding channel extends between the fuel evaporator unit and an exhaust gas carrying component and discharges into an exhaust gas carrying component upstream of the catalytic converter unit.

The fuel evaporator unit including an electrical heating element is installed in spatial separation from the exhaust gas carrying components. Therefore, the fuel evaporator unit does not extend into any of the exhaust gas carrying components upstream from the catalytic converter unit. The spatial separation of the fuel evaporator unit from exhaust gas carrying components, and the feeding of the fuel vapors provided by the fuel evaporator unit into the exhaust pipe upstream of the catalytic converter unit through a fuel vapor feeding channel, prevents the fuel evaporator unit from being exposed to the considerably fluctuating exhaust gas temperatures during vehicle operation. The environmental conditions the fuel evaporator unit is expected to deliver fuel vapors are easier to monitor and control. This allows the functional optimization of the fuel evaporator unit including an electrical heating element and makes it suitable for the evaporation of diesel fuel with consistently favorable results. Furthermore, the supply of fuel vapors delivered into the exhaust pipe by the fuel evaporator unit using a fuel vapor feeding channel results in less interference with the flow conditions within the exhaust pipe than using conventional burners and an increased degree of flexibility regarding the spatial arrangement and/or packaging of the fuel evaporator unit. This is particularly advantageous for modem vehicles occasionally having extremely tight installation conditions for the exhaust system.

The physical process occurs in the fuel evaporator unit alone where the state of matter of the diesel fuel changes from the liquid to the vapor state; there is no chemical change of the diesel fuel occurring, such as reformation or the like.

The system may regenerate a particulate filter, regenerate a $NO_x$ accumulating catalytic converter, or may regenerate a combined exhaust gas purification device. In the former case the entire amount of fuel vapors generated by the fuel evaporator unit is ducted into the exhaust gas stream upstream from an oxidizing catalytic converter connected upstream of the diesel particulate filter. Depending on the specific operating point of the engine, an appropriate amount of fuel is evaporated and subsequently catalytically burned in the oxidizing catalytic converter to ensure that the temperature of the exhaust gases downstream of the oxidizing catalytic converter is sufficient for the regeneration of the downstream particulate filter. If the system is utilized for the regeneration of an $NO_x$ accumulating catalytic converter, the fuel vapors generated by the fuel evaporator unit are used to enrich the exhaust gases ducted to the $NO_x$ accumulating catalytic converter.

In combination systems, the spatial separation of the fuel evaporator unit from the exhaust gas carrying components provides several advantages. It takes only a single fuel evaporator unit to produce the fuel vapors for the regeneration of the particulate filter and the $NO_x$ accumulating catalytic converter.

The fuel vapor feeding channel discharges into a cross-sectional reduction of the specific exhaust gas carrying component, such as a venturi nozzle. The resulting pressure drop in the fuel vapor feeding channel and the fuel evaporator unit promotes the evaporation of the diesel fuel and, by lowering the boiling range, contributes to the reduction of electrical energy consumed for the evaporation.

Preferably, the fuel evaporator unit includes an upright glow plug which, while maintaining an annular gap, is surrounded by a jacket tube into which both the fuel line and the fuel vapor feeding channel enter. The upright arrangement of the glow plug promotes a homogenous evaporation of the diesel fuel fed into the annular gap defined between the glow plug and the jacket tube. Preferably, the internal diameter of the annular gap is between 0.6 mm and 2 mm. With this dimensioning and with respect to the evaporation results, optimum conditions are obtained for the individual key factors such as heat transfer, dripping due to boiling, capillary effects and the like.

A spiral guide element can be installed in the annular gap between the glow plug and the jacket tube. The guide element guides the heated and boiling fuel and, subsequently, the fuel vapors in a spiral path around the glow plug so that any localized temperature differences on the surface of the glow plug can be evened out. Additionally due to the respective, extended flow path, a homogenizing effect for the prepared fuel vapors is obtained. Furthermore, due to the spin flow, any developing fuel drippings are exposed to centrifugal forces that promote condensation on the jacket tube. Therefore, in particularly compact fuel evaporator units, the risk of the fuel drippings getting into the exhaust gas stream is very low. This risk can be further reduced by facing the fuel vapor feeding channel's end to the fuel evaporator unit and extend into the jacket tube above the glow plug. This is because there is a cyclonic function of the unit including the fuel evaporator unit and the fuel vapor feeding channel, and the fuel vapors drawn from the fuel evaporator unit are free of any fuel drippings that, driven by centrifugal force, would drift radially outward in the direction of the jacket tube.

The jacket tube is encompassed by an insulator, allowing the environment in which the evaporator unit operates to be evened out further.

The preferable ratio of the fuel vapor feeding channel cross-section to the cross-section of the exhaust gas carrying component in the area of the fuel vapor feeding channel outlet is between 0.006 and 0.015. This ratio proves to be particularly favorable with regard to a sufficiently good mixture of fuel vapors fed into the exhaust gas stream, without interfering with the flow conditions in the exhaust pipe when not in the regenerating mode.

The amount of fuel vapors required for the regenerating mode depends on the individually different conditions. If, due to the specific structural conditions, a particularly large amount of fuel vapors is to be provided to initiate the regeneration of the particulate filter and/or the $NO_x$ accumulating catalytic converter by the fuel evaporator unit within a short period of time (especially taking into account the capacity of the electrical system of the particular vehicle) a preheating stage in which fuel is preheated may be connected upstream of the fuel evaporator unit. The preheating stage may include an intermediate accumulator in which the amount of fuel required for a one-time regeneration of the particulate filter may be temporarily stored and, using a suitable preheating element (such as an electrical resistor-type heating element), preheated to a temperature level slightly below the boiling temperature. Gradual preheating of the fuel over a longer period of time, i.e., during the interval between two regeneration runs, helps the capacity of the electrical system in conventional motor vehicles. In addition, or alternatively, to an electrical heating elements the preheating stage may also include a heat exchanger installed in the exhaust gas stream, in which the fuel that is to be evaporated later in the fuel evaporator unit is heated utilizing the heat of the exhaust gases.

It may be useful to evaporate and store on-demand the amount of fuel required for the regeneration of the diesel particulate filter during the interval between two regeneration cycles. The fuel evaporator unit appropriately includes a pressure vessel with a heating device installed in it. The fuel vapors exiting the pressure vessel during regeneration may, especially for the benefit of its homogenization and/or additional heating, be ducted through a secondary heater. The above comments on preheating the fuel fed to the fuel evaporator unit in a preheating stage also apply here.

If the invention is utilized for the regeneration of a particulate filter, the oxidizing converter unit and the particulate filter are placed in separate housings. This facilitates a particularly high reaction density in the oxidizing converter unit (which regarding its configuration is especially attuned to this function), resulting in a quick reaction and, consequently, a rapid initiation of the regeneration of the particulate filter and a low fuel consumption. A more homogenous temperature distribution of the heated exhaust gases entering the particulate filter can be ascertained. However, it is to be understood that installing the oxidizing converter unit and the particulate filter in separate housings is not required. Under certain conditions, e.g., the installation conditions, it may rather be advantageous to place the oxidizing converter unit and the particulate filter in a common housing, specifically when the oxidizing converter unit is represented by a catalytically coated area of the particulate filter.

A temperature sensor can be placed between the oxidizing converter unit and the particulate filter. The temperature sensor communicates with a controller which, in the regeneration mode controls the delivery rate of a fuel pump that feeds the fuel evaporator unit in dependence on the exhaust gas temperature measured upstream of the particulate filter. Using an appropriate automatic variation of the fuel volume delivered to the fuel evaporator unit by the fuel pump, the specific engine operating point and the dependence of the exhaust gas temperature on this point can be taken into consideration. By appropriately adapting the evaporated fuel volume, the exhaust gas temperature may be controlled upstream of the particulate filter at a temperature value (e.g., 650° C.) optimized for the regeneration of the particular filter.

These and other features of the present invention will be best understood from the following specification and drawings.

BRIEF DESCRIPTION OF THE DRAWINGS

In the following this invention is explained in more detail using a few embodiments represented in the drawing. Shown are.

DETAILED DESCRIPTION OF THE PREFERRED EMBODIMENT

Figure 1:
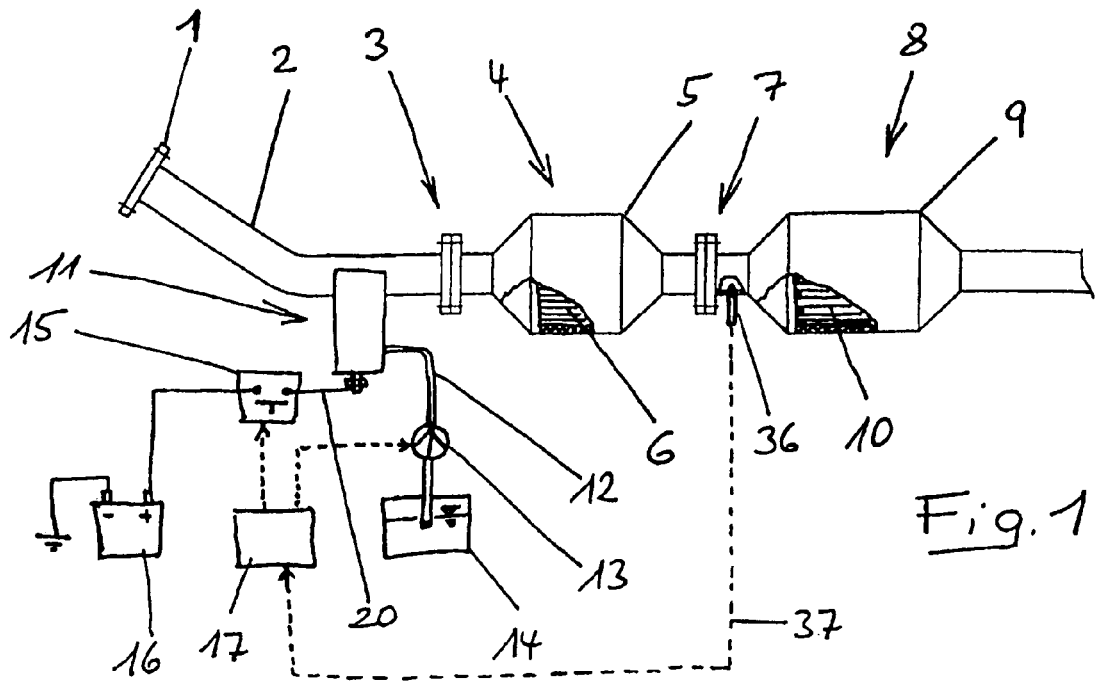
FIG. 1 schematically illustrates a partial section of an exhaust system built according to the present invention.

FIG. 1 illustrates a partial section of an exhaust system including a pre-tube 2 connectable to a manifold by a flange 1 and a catalytic converter assembly 4 connected to the pre-tube 2 by a flange connection 3. An oxidizing converter unit 6 is located in a catalytic converter housing 5 and a filter assembly 8 is connected to the catalytic converter assembly 4 with a flange connection 7. A particulate filter 10 is located in a particulate filter housing 9. Relatively close to the flange connection 3, the pre-tube 2 has a fuel evaporator unit 11 which feeds evaporated diesel fuel into the exhaust gas stream flowing through the pre-tube 2.

The fuel evaporator unit 11 is connected to a fuel tank 14 of the vehicle by a fuel line 12 having an integrated pump 13. Furthermore, the fuel evaporator unit 11 is connected to a power source 16 of the vehicle using a switch 15. The switch 15 is controlled in a generally known manner by a controller 17 which analyzes several input variables, especially the pressure drop across the particulate filter, to initiate the regeneration process by closing the switch 15 and, with a defined time delay, starting the pump 13.

Figure 2:
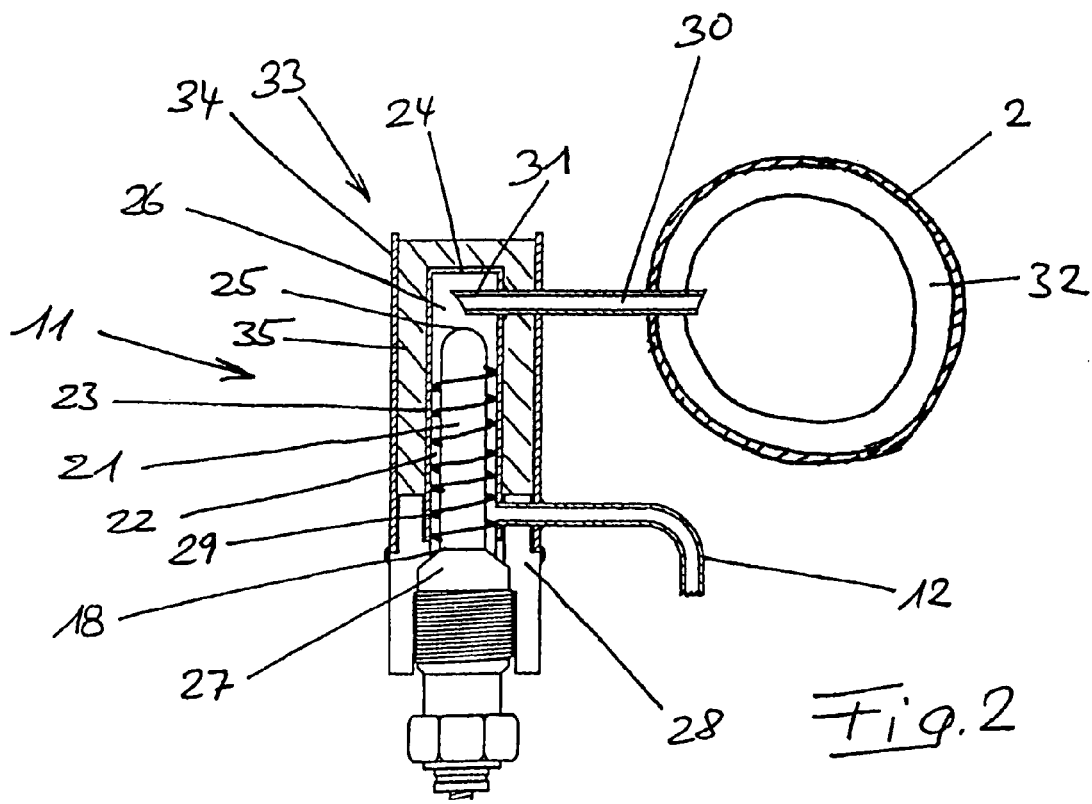
FIG. 2 schematically illustrates a vertical section through the fuel evaporator unit utilized in the exhaust system of FIG. 1.

As shown in FIG. 2, the fuel evaporator unit 11 includes an electrical heating element in the form of a glow plug 18 in an upright position. An electrical connector 19 has an electrical connecting cable 20 (FIG. 1) connected to it. A cylindrical glow pencil 21 of the glow plug 18 is encompassed by a jacket tube 23, maintaining an annular gap 22 with an internal width of 1 mm. On its face, the jacket tube 23 is hermetically closed by a lid 24, forming a vapor withdrawal space 26 generated by an appropriate gap between the lid 24 and the tip 25 of the glow pencil 21. Facing the base 27 of the glow plug 18, the jacket tube 23 is hermetically closed through the socket 28.

The annular gap 22 contains a spiral guide element 29 surrounding the glow pencil 21 in a spiral fashion. The fuel line 12 enters the jacket tube 23 adjacent to the base 27 of the glow plug 18.

A fuel vapor feeding channel 30 in the shape of a small tube connects the fuel evaporator unit 11 with the pre-tube 2. The end oriented toward the fuel evaporator unit 11 is configured as a fuel vapor withdrawal connector 31 that extends into the vapor withdrawal space 26. The opposing end of the fuel vapor feeding channel 30 extends into the narrowest cross-section of a venturi insert 32 installed in the pre-tube 2.

The fuel evaporator unit 11 includes an insulator 33 surrounding the jacket tube 23 having an outer tube 34 and an insulating material 35 that fills the space between the jacket tube 23 and the outer tube 34.

A temperature sensor 36 located between the oxidizing converter unit 6 and the particulate filter 10 senses the temperature of the exhaust gases upstream of the particulate filter. A signal line 37 communicates with the controller 17 in the regeneration mode to control the delivery rate of the fuel pump 13 that feeds the fuel evaporator unit 11, depending on the exhaust gas temperature measured upstream of the particulate filter 10.

The system illustrated in FIGS. 1 and 2 can be modified in a manner that makes the exhaust gas purification device to be regenerated no longer a matter of a particulate filter but rather a $NO_x$ accumulating converter. The particulate filter including the upstream oxidizing converter is replaced by a $NO_x$ accumulating converter.

Figure 3:
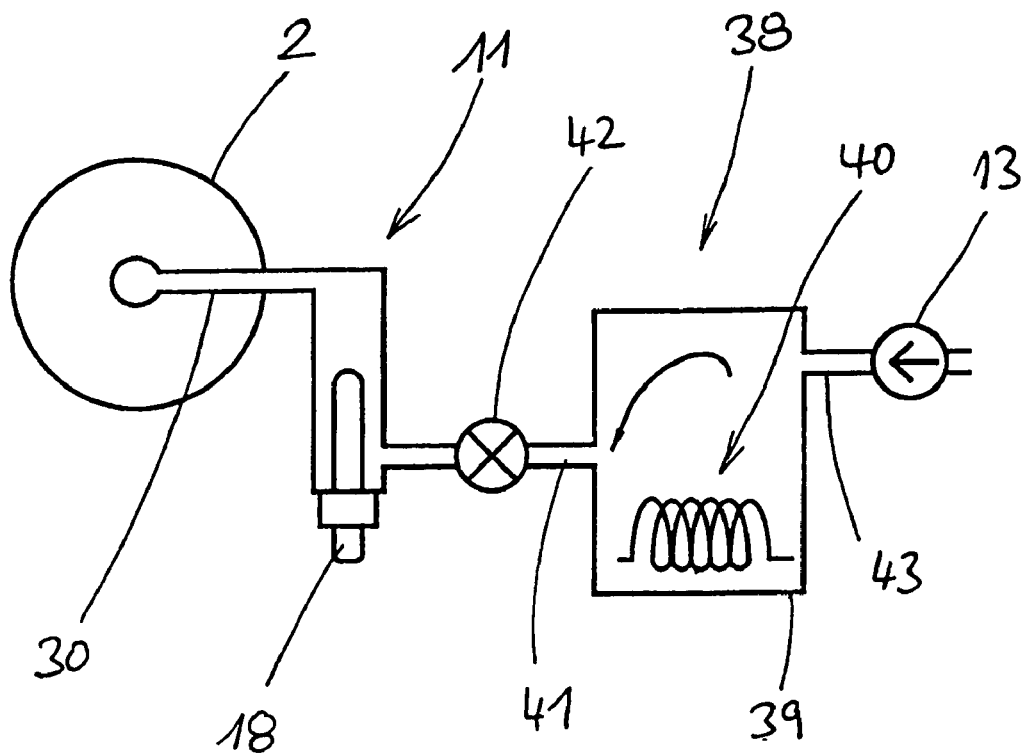
FIG. 3 schematically illustrates a potential combination of the fuel evaporator unit of FIG. 2 including a preheating stage.

FIG. 3 illustrates an alternate embodiment including a preheating stage 38 connected upstream of the fuel evaporator unit 11. The preheating stage 38 includes an intermediate accumulator 39 having a capacity dimensioned to match the amount of fuel required for a one-time regeneration of the particulate filter. Fuel is delivered to the intermediate accumulator 39 from the vehicle fuel tank by the pump 13. A preheating element 40 in the form of an electrical resistor-type heating element is installed in the intermediate accumulator 39. The fuel absorbed by the intermediate accumulator 39 is gradually heated, and the temperature of the fuel at initiation of the regeneration process is slightly below the boiling temperature.

A valve 42 is located in the flow channel 41 through which preheated fuel is delivered from the preheating stage 38 to the fuel evaporator unit 11. The valves, like the pump 13, is being appropriately controlled by a controller to initiate or terminate the regeneration process.

The intermediate accumulator 39 has a fuel feed connector 43. The fuel discharge connector is installed such that during regeneration of the particulate filter, the mixing of the fuel that has replenished the intermediate accumulator 39 with the fuel already preheated is minimized to ensure that the fuel already preheated is delivered to the fuel evaporator unit 11 at the highest possible temperature level.

Figure 4:
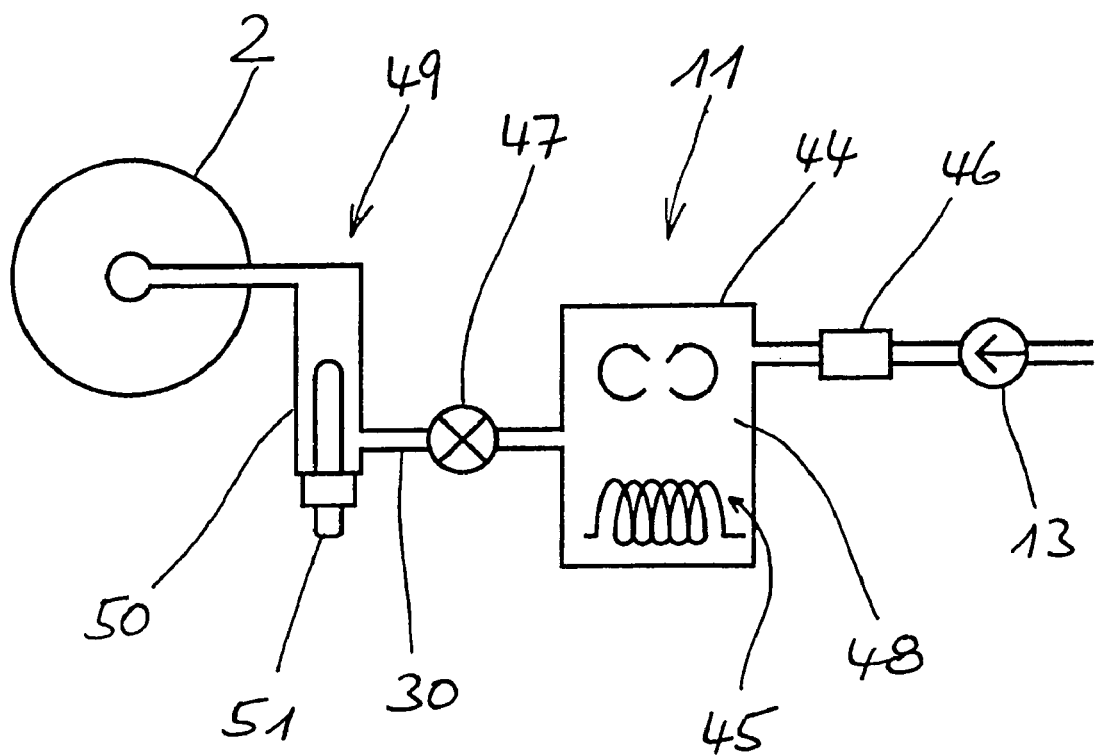
FIG. 4 schematically illustrates the potential configuration of the fuel evaporator unit for pre-evaporation.

FIG. 4 illustrates an embodiment capable of producing for "stockpiling" and keeps all the fuel vapors required for the regeneration of the particulate filter on demand. The fuel evaporator unit 11 includes a pressure vessel 44 with an electrical heating device 45 located in it. Fuel drawn from the fuel tank of the vehicle is delivered to the pressure vessel 44 by the pump 13 through a valve 46. An additional valve 47 is connected downstream from the pressure vessel 44. The heating device 45 gradually evaporates the fuel fed into the pressure vessel 44. The generated vapors 48 are stockpiled in the pressure vessel 44 until regeneration is initiated.

When the valve 47 is opened to initiate the regeneration of the particulate filter, the previously prepared fuel vapors 48 flow into the pre-tube 2 through the fuel vapor feeding channel 30. The fuel vapor feeding channel 30 has a secondary heater 49 integrated into it including a glow plug 51 inserted into a jacket tube 50. The fuel vapors 48 are homogenized and post-heated before reaching the exhaust gas stream on the surface of the jacket tube 50.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An exhaust system for a diesel propulsion engine comprising:
   a discontinuously regenerating exhaust gas purification system including a catalytic converter unit that burns diesel fuel catalytically wherein the discontinuously regenerating exhaust gas purification system periodically regenerates a filter;
   a fuel evaporator unit connected upstream from the catalytic converter unit and including an electrical heating element, wherein the fuel evaporator unit is adapted for connection to a vehicle fuel tank by a fuel line and installed with spatial separation from an exhaust gas carrying component and wherein the fuel evaporator unit is only used to change fuel from a liquid state to a vapor state; and
   a fuel vapor feeding channel upstream of the catalytic converter unit wherein the fuel vapor feeding channel discharges into the exhaust gas carrying component, and extends between the fuel evaporator unit and the exhaust gas carrying component.

2. The exhaust system according to claim 1 wherein the discontinuously regenerating exhaust gas purification system further includes a discontinuously regenerating $NO_x$ accumulating converter.

3. The exhaust system according to claim 1 wherein the fuel vapor feeding channel discharges into a cross-sectional restriction of the exhaust gas carrying component.

4. The exhaust system according to claim 1 wherein the fuel evaporator unit comprises a pressure vessel having a heating device, and two valves control flow through the fuel evaporator unit.

5. The exhaust system according to claim 1 wherein a ratio of a cross-section of the fuel vapor feeding channel to a cross-section of the exhaust gas carrying component is between 0.006 and 0.015 near an outlet to the fuel vapor feeding channel.

6. The exhaust system according to claim 1, wherein the filter comprises a discontinuously regenerating particulate filter, and including an oxidizing converter unit connected upstream of the discontinuously regenerating particulate filter wherein the oxidizing converter unit heats exhaust gases flowing toward the discontinuously regenerating particulate Filter through catalytic combustion of fuel vapors produced by the fuel evaporator unit.

7. The exhaust system according to claim 6 wherein the oxidizing converter unit and the discontinuously regenerating particulate filter are installed in separate housings.

8. The exhaust system according to claim 6 further including a controller and a temperature sensor located between the oxidizing converter unit and the discontinuously regenerating particulate filter and connected to the controller which in a regeneration mode controls a delivery rate of a fuel pump that feeds the fuel evaporator unit depending on an exhaust gas temperature measured upstream of the discontinuously regenerating particulate filter.

9. The exhaust system according to claim 6 wherein the oxidizing converter unit and the discontinuously regenerating particulate filter are installed in a common housing.

10. The exhaust system according to claim 9 wherein the oxidizing converter unit is represented by a catalytically coated area of the discontinuously regenerating particulate filter.

11. The exhaust system according to claim 1 further including a jacket tube, and wherein the fuel evaporator unit comprises an upright mounted glow plug which is encompassed by the jacket tube to define an annular gap, and the fuel line and the fuel vapor feeding channel discharge into the annular gap.

12. The exhaust system according to claim 11 wherein an end of the fuel vapor feeding channel oriented toward the fuel evaporator unit extends into the jacket tube.

13. The exhaust system according to claim 11 further including an insulator, and wherein the jacket tube is encompassed by the insulator.

14. The exhaust system according to claim 11 wherein the fuel evaporator unit further comprises a preheating stage connected upstream of the fuel evaporator to evaporate the fuel.

15. An exhaust system for a diesel propulsion engine comprising:
   a discontinuously regenerating exhaust gas purification system including a catalytic converter unit that burns diesel fuel catalytically wherein the discontinuously regenerating exhaust gas purification system periodical regenerates a filter;
   a fuel evaporator unit connected upstream from the catalytic converter unit and including an electrical heating element, wherein the fuel evaporator unit is adapted for connection to a vehicle fuel tank by a fuel line and installed with spatial separation from an exhaust gas carrying component;
   a fuel vapor feeding channel upstream of the catalytic converter unit wherein the fuel vapor feeding channel discharges into the exhaust gas carrying component, and extends between the fuel evaporator unit and the exhaust gas carrying component; and
   a jacket tube wherein the fuel evaporator unit comprises an upright mounted glow plus which is encompassed by the jacket tube to define an annular gap, and the fuel line and the fuel vapor feeding channel discharge into the annular gap wherein an inside width of the annular gap is between 0.6 mm and 2.0 mm.

16. An exhaust system for a diesel propulsion engine comprising:
   a discontinuously regenerating exhaust gas purification system including a catalytic converter unit that burns diesel fuel catalytically wherein the discontinuously regenerating exhaust gas purification system periodically regenerates a filter;

a fuel evaporator unit connected upstream from the catalytic converter unit and including an electrical heating element wherein the fuel evaporator unit is adapted for connection to a vehicle fuel tank by a fuel line and installed with spatial separation from an exhaust gas carrying component; and a fuel vapor feeding channel upstream of the catalytic converter unit wherein the fuel vapor feeding channel discharges into the exhaust gas carrying component, and extends between the fuel evaporator unit and the exhaust gas carrying component;

a jacket tube wherein the fuel evaporator unit comprises an upright mounted glow plug which is encompassed by the jacket tube to define an annular gap, and the fuel line and the fuel vapor feeding channel discharge into the annular gap; and a spiral guide element located in the annular gap.

17. An exhaust system for a diesel propulsion engine comprising:

discontinuously regenerating exhaust gas purification system including a catalytic converter unit that burns diesel fuel catalytically wherein the discontinuously regenerating exhaust gas purification system periodically regenerates a filter;

a fuel evaporator unit connected upstream from the catalytic converter unit and including an electrical heating element, wherein the fuel evaporator unit is adapted for connection to a vehicle fuel tank by a fuel line and installed with spatial separation from an exhaust gas carrying component and wherein the fuel evaporator unit further comprises a preheating stage connected upstream of the fuel evaporator unit to evaporate the fuel and wherein the preheating stage comprises an intermediate accumulator with a heating device;

a fuel vapor feeding channel upstream of the catalytic converter unit wherein the fuel vapor feeding channel discharges into the exhaust gas carrying component, and extends between the fuel evaporator unit and the exhaust gas carrying component; and a jacket tube wherein the fuel evaporator unit comprises an upright mounted glow plug which is encompassed by the jacket tube to define an annular gap, and the fuel line and the fuel vapor feeding channel discharge into the annular gap.

18. The exhaust system according to claim 17 wherein the preheating stage comprises a heat exchanger exposed to an exhaust gas stream.

19. An exhaust system for a diesel propulsion engine comprising:

a discontinuously regenerating exhaust gas purification system including a catalytic converter unit that burns diesel fuel catalytically wherein the discontinuously regenerating exhaust gas purification system periodically regenerates a filter;

a fuel evaporator unit connected upstream from the catalytic converter unit and including an electrical heating element, wherein the fuel evaporator unit is adapted for connection to a vehicle fuel tank by a fuel line and installed with spatial separation from an exhaust gas carrying component and wherein the fuel evaporator unit comprises a pressure vessel having a heating device, and two valves control flow through the fuel evaporator unit, and wherein the fuel evaporator unit comprises a secondary heater connected downstream of the fuel evaporator unit far fuel vapors discharged from the pressure vessel; and a fuel vapor feeding channel upstream of the catalytic converter unit wherein the fuel vapor feeding channel discharges into the exhaust gas carrying component, and extends between the fuel evaporator unit and the exhaust gas carrying component.

20. An exhaust system for a diesel propulsion engine comprising:

a discontinuously regenerating exhaust gas purification system including a catalytic converter unit that burns diesel fuel catalytically wherein the discontinuously regenerating exhaust gas purification system periodically regenerates a filter;

a fuel evaporator unit connected upstream from the catalytic converter unit and including an electrical heating element, wherein the fuel evaporator unit is adapted for connection to a vehicle fuel tank by a fuel line and installed with spatial separation from an exhaust gas carrying component; and a fuel vapor feeding channel upstream of the catalytic converter unit wherein the fuel vapor feeding channel discharges into the exhaust gas carrying component, and extends between the fuel evaporator unit and the exhaust gas carrying component, the fuel vapor feeding channel discharging into a cross-sectional restriction of the exhaust gas carrying component, wherein the cross-sectional restriction is a venturi nozzle.

* * * * *

UNITED STATES PATENT AND TRADEMARK OFFICE
CERTIFICATE OF CORRECTION

PATENT NO. : 7,010,909 B2
APPLICATION NO. : 10/727136
DATED : March 14, 2006
INVENTOR(S) : Ranalli et al.

Page 1 of 1

It is certified that error appears in the above-identified patent and that said Letters Patent is hereby corrected as shown below:

Column 9, Line 20: Please add --a-- before "discontinously"

Column 10, Line 18: Please delete "far" and insert --for--

Signed and Sealed this

Fifteenth Day of August, 2006

JON W. DUDAS
*Director of the United States Patent and Trademark Office*